United States Patent
Moribe et al.

(10) Patent No.: US 6,597,404 B1
(45) Date of Patent: Jul. 22, 2003

(54) PHASE CONTROLLER OF HORIZONTAL DRIVE PULSE AND METHOD OF THE SAME

(75) Inventors: Hiroshi Moribe, Osaka (JP); Nobuo Taketani, Hyogo (JP); Hisao Morita, Osaka (JP); Hiroshi Ando, Osaka (JP); Ryuichi Shibutani, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/623,258
(22) PCT Filed: Feb. 15, 2000
(86) PCT No.: PCT/JP00/00811
§ 371 (c)(1), (2), (4) Date: Dec. 11, 2000
(87) PCT Pub. No.: WO00/49798
PCT Pub. Date: Aug. 24, 2000

(30) Foreign Application Priority Data

Feb. 19, 1999 (JP) ............................................. 11-041190

(51) Int. Cl.$^7$ .............................. H03L 7/00; H04N 5/06
(52) U.S. Cl. ...................... 348/540; 348/521; 348/536
(58) Field of Search ................................ 348/536, 521, 348/531, 540, 541; 327/156, 158; 315/371, 370, 396, 387, 399, 408, 403; H04N 5/06, 9/45, 9/455; H03L 7/00

(56) References Cited

U.S. PATENT DOCUMENTS

| | | | | |
|---|---|---|---|---|
| 3,970,894 A | * | 7/1976 | Yasuda et al. | 315/370 |
| 5,621,485 A | * | 4/1997 | Terao et al. | 34/536 |
| 5,760,839 A | * | 6/1998 | Sumiyoshi | 348/541 |
| 5,777,520 A | * | 7/1998 | Kawakami | 348/540 |
| 6,087,788 A | * | 7/2000 | Kawasumi | 348/540 |
| 6,097,440 A | * | 8/2000 | Omori et al. | 348/536 |

FOREIGN PATENT DOCUMENTS

| | | |
|---|---|---|
| EP | 0 773 671 | 5/1997 |
| JP | 08-051556 | 2/1996 |

\* cited by examiner

Primary Examiner—John Miller
Assistant Examiner—Trang U. Tran
(74) Attorney, Agent, or Firm—McDermott, Will & Emery

(57) ABSTRACT

A phase controller of a horizontal drive pulse fed into a horizontal deflection circuit supplying a horizontal deflection pulse, and a control method of the same are disclosed. A frequency discriminator identifies a format of video-input-signal by detecting a frequency of the horizontal sync signal. A reference phase generator generates a reference phase signal based on the output from the frequency discriminator. A sawtooth waveform generator generates a sawtooth waveform signal responsive to the output from the frequency discriminator. A phase difference voltage detector outputs a phase difference voltage responsive to the phase difference between the reference phase signal and the horizontal deflection pulse. A phase control signal generator generates a phase control signal using the phase difference voltage and the sawtooth waveform signal. Horizontal drive pulse generator outputs a horizontal drive pulse having a phase responsive to the phase control signal. The phase controller and the phase control method as structured above realize a stable phase control of the horizontal drive pulses in video display devices.

10 Claims, 4 Drawing Sheets

PHASE CONTROLLER OF HORIZONTAL DRIVE PULSE AND METHOD OF THE SAME

TECHNICAL FIELD

The present invention relates to a phase controller of horizontal drive pulses fed to a horizontal deflection circuit in a video display device such as a television receiver (hereinafter referred to as a TV), and a method of controlling the horizontal drive pulses.

BACKGROUND ART

The digital broadcasting system recently drawing public attention requires video display devices including TVs to equip a function, i.e. dealing with input signals of various formats of multi-media, as one of important functions.

A fundamental function of the video display devices dealing with videoinput-signals of various formats is to display the respective video-input-signals with various horizontal frequencies at a given horizontal position in a stable manner.

A horizontal automatic-frequency-control (AFC) circuit has been used in order to display the video-input-signal at a given horizontal position. The horizontal AFC circuit compares respective phases of a horizontal sync signal and a horizontal deflection pulse (sometimes referred to as a flyback pulse)—the horizontal sync signal is separated from the video-input-signal—thereby producing a horizontal drive pulse in-sync with the horizontal sync signal. The horizontal AFC circuit thus has a phase control loop. Japanese Patent Application Non-Examined Publication No. H08-51556 discloses an example of this structure.

The video display devices dealing with video-input-signals of various formats should control correctly a phase of the horizontal drive pulse when a video-signal of any format is input.

A desirable phase difference between the horizontal drive pulse and the horizontal deflection pulse depends on a format of the video-input-signal.

The phase difference between the horizontal sync signal and the horizontal deflection pulse should be desirably adjusted responsive to video signals in respective formats by controlling the phase of the horizontal drive pulse.

DISCLOSURE OF THE INVENTION

The present invention aims to realize the desirable function discussed above. A phase controller, of the present invention, of a horizontal drive pulse supplied to a horizontal deflection circuit, comprises the following elements:

(a) a frequency discriminator for identifying which format of a video signal is input by detecting a frequency of a horizontal sync signal;

(b) a reference phase generator for generating a reference phase signal based on an output from the frequency discriminator;

(c) a sawtooth waveform generator for generating a sawtooth waveform signal responsive to the output from the frequency discriminator;

(d) a phase difference voltage detector for outputting a phase difference voltage responsive to a phase difference between the reference phase signal and a horizontal deflection pulse;

(e) a phase control signal generator for generating a phase control signal by comparing the phase difference voltage with the sawtooth waveform signal; and (f) a horizontal drive pulse generating circuit for outputting a horizontal drive pulse having a phase responsive to the phase control signal.

The structure discussed above identifies which format of a video signal is input by detecting a frequency of the horizontal sync signal, thereby controlling the horizontal deflection pulse to carry the phases proper for the video-input-signal.

This phase controller of the horizontal drive pulse can further comprise the following elements:

(g) a substitutive-signal generating circuit for generating a signal substitutive for the horizontal drive pulse, and the substitutive signal being fed into the horizontal deflection circuit;

(h) a horizontal output control circuit for selecting one of the horizontal drive pulse or the substitutive signal depending on the stability of the horizontal sync signal; and (i) a switcher for outputting one of the horizontal drive pulse or the substitutive signal by switching therebetween responsive to an output from the horizontal output control circuit.

The structure discussed above allows the horizontal deflection circuit to avoid an input of an unstable horizontal drive pulse when the horizontal drive pulse is not satisfactorily controlled due to an unstable horizontal sync signal, so that the horizontal deflection circuit avoids an unstable operation.

DETAILED DESCRIPTION OF PREFERRED EMBODIMENTS

The exemplary embodiments of the present invention are demonstrated hereinafter with reference to the accompanying drawings.

Exemplary Embodiment 1

Figure 1:
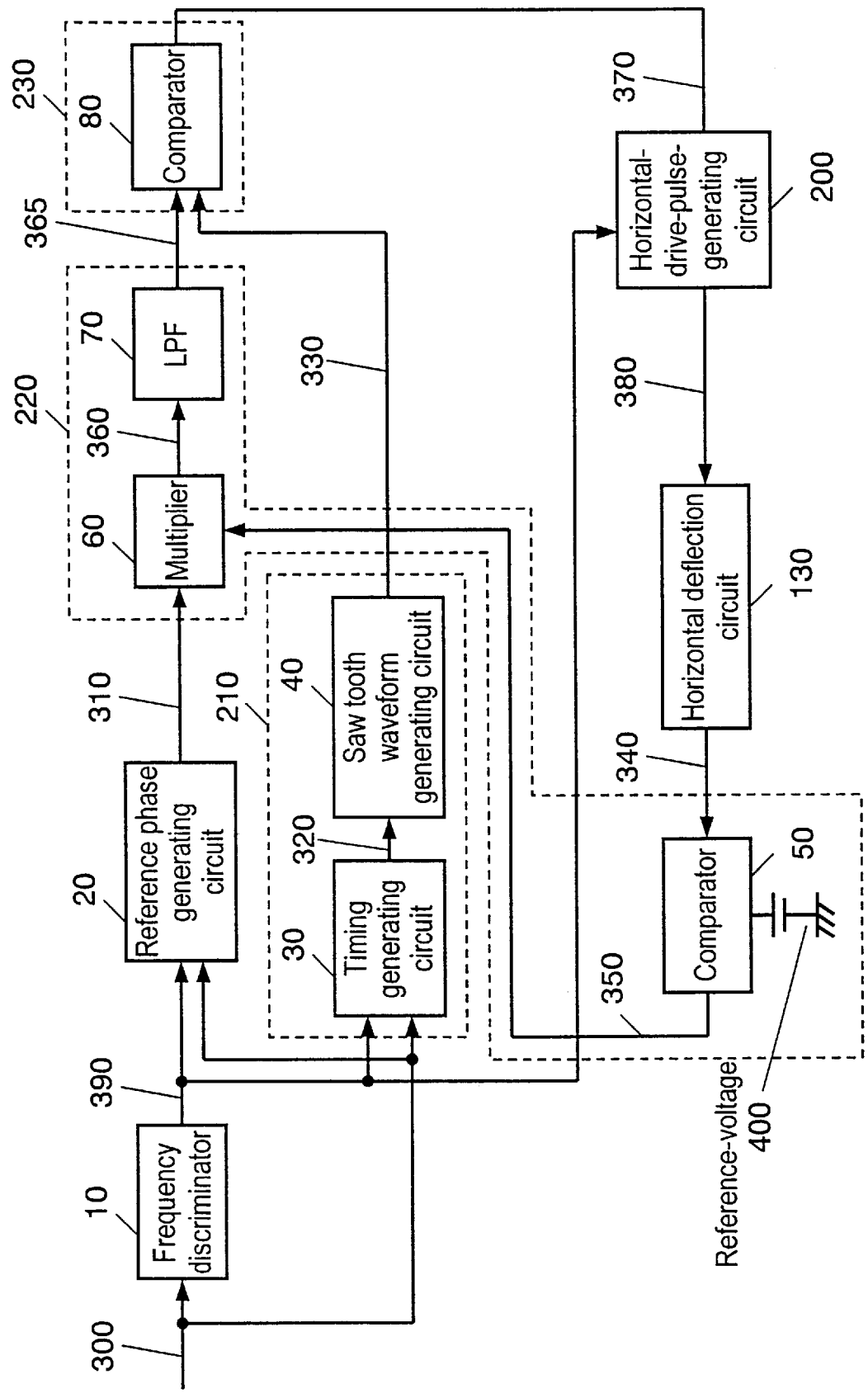
FIG. 1 is a block diagram of a phase controller of a horizontal drive pulse in accordance with a first exemplary embodiment of the present invention.

In FIG. 1, frequency discriminator 10 identifies which format of video signal is input (e.g. an interlaced signal or a progressive signal) by detecting a frequency of horizontal sync signal 300 sync-separated from the video-input-signal. Reference phase generating circuit 20 receives horizontal sync signal 300 and discrimination signal 390 indicating a result of discriminator 10, and outputs a given reference-phase-signal 310 in order to provide a video signal to be input with an adequate phase of a horizontal deflection pulse. Reference-phase-signal 310 has an optimum phase difference for the horizontal sync signal of respective formats of video signals (respective optimum phase differences have been stored as a table in a memory, and an optimum one adequate for the format of the video-input-signal is selected from the table.)

Sawtooth waveform generating section 210, comprising timing generating circuit 30 and sawtooth waveform generating circuit 40, outputs a sawtooth waveform signal—having a phase corresponding to a format of video-input-signal.

Timing-generating-circuit 30 receives horizontal sync signal 300 and discrimination signal 390, then generates timing signal 320 providing sawtooth wave generataing circuit 40 with a given timing responsive to a video signal to be input. The given timing has been stored in a memory in the form of a table and is selected from the table. Sawtooth waveform generating circuit 40 outputs sawtooth waveform signal 330 having a phase in response to timing signal 320.

Phase-difference-voltage-detecting-section 220—comprising multiplier 60, comparator 50 and low pass filter (LPF) 70—outputs a voltage indicating a phase difference between reference-phase-signal 310 and horizontal-deflection-pulse 340.

Multiplier 60 multiplies reference-phase-signal 310 and another input signal 350, then produces output signal 360. LPF 70 averages output 360, then outputs averaged dc voltage 365.

Comparator 80 is an element of phase-control-signal-generating section 230 outputting a phase-control-signal for determining a phase of the horizontal drive pulse. Comparator 80 compares sawtooth waveform signal 330 with voltage 365, then outputs phase-control-signal 370 which stays at a high level during the period when signal 330 is greater than averaged dc voltage 365 and stays at a low level during the other periods. Signal 370 determines the phase of the horizontal drive pulse.

Horizontal-drive-pulse-generating circuit 200 synchronizes with a rise of phase-control-signal 370, then outputs horizontal-drive-pulse 380, having a given duty rate corresponding to the video signal, in response to discrimination signal 390 supplied from frequency discriminator 10.

Horizontal deflection circuit 130 receives horizontal-drive-pulse 380, then outputs horizontal-deflection-pulse 340. Comparator 50 compares horizontal-deflection-pulse 340 with a given reference-voltage 400, and produces signal 350 taking a high level only when horizontal-deflection-pulse 340 is greater than reference-voltage 400, then outputs signal 350 to multiplier 30.

An operation of the phase controller—having a structure as discussed above -of the horizontal-drive-pulse is detailed with reference to FIG. 2.

Figure 2:
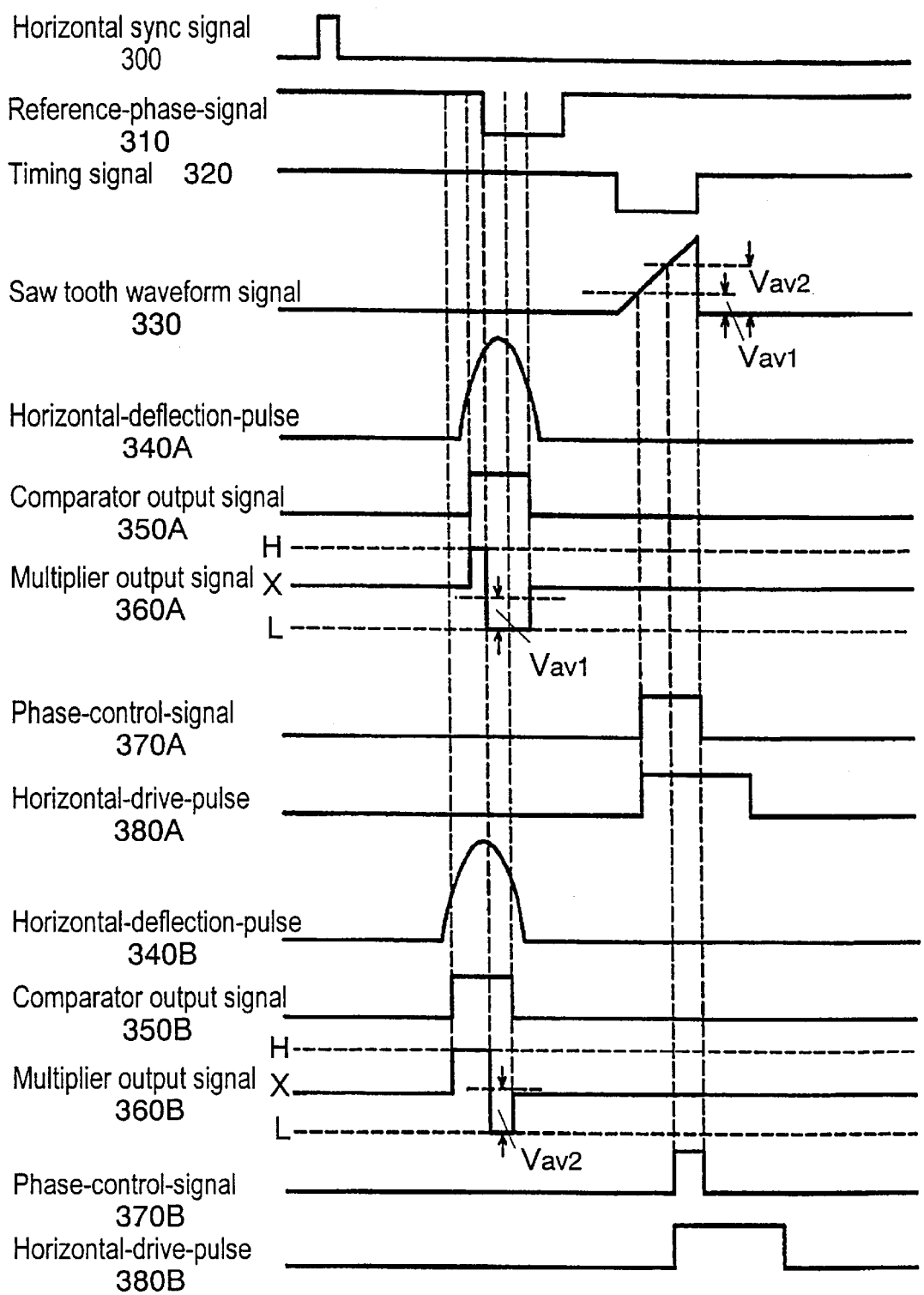
FIG. 2 depicts waveforms illustrating operations of respective sections of the phase controller of the horizontal drive pulse of the present invention.

In FIG. 2, reference-phase-signal 310 has a given phase-difference from the horizontal-sync-signal 300 in response to discrimination signal 390. Timing signal 320 has another given phase difference from signal 300 in response to discrimination signal 390. Sawtooth waveform signal 330 gradually rises when timing signal 320 starts falling, and abruptly falls when timing signal 320 starts rising.

Comparator 50 produces output signal 350 indicating a result of the comparison between reference voltage 400 and horizontal-deflection-pulse 340.

As shown in FIG. 2, for instance, when horizontal-deflection-pulse 340A—having a phase delayed from a desirable phase (a fall of reference-phase-signal 310) with regard to horizontal-sync-signal 300—is output from horizontal-deflection-circuit 130, comparator 50 outputs signal 350A. At this time, multiplier 60 multiplies signal 350A and reference-phase-signal 310 during the period when signal 350A stays at a high level, and then produces resultant output signal 360A. The output from multiplier 60 stays at a high impedance during the other periods than signal 350A stays at a high level.

LPF 70 outputs voltage "Vav1"—obtained by averaging the output 360A from multiplier 60—as voltage 365 while signal 350A stays at a high level. Comparator 80 outputs phase-control-signal 370A which takes a high level when sawtooth waveform signal 330 is greater than average voltage "Vav1". Horizontal-drive-pulse 380A rises when phase-control-signal 370A starts rising, and has a given duty cycle in response to discrimination signal 390 supplied from discriminator 10.

Assume that the phase of the horizontal-deflection-pulse 340A delays from a desirable phase (a fall of reference-phase-signal 310) as shown in FIG. 2, and this delay entails averaged voltage "Vav1" to lower. The lower "Vav1" further advances a phase of horizontal-drive-pulse 380A. As a result, horizontal-deflection-circuit 130 outputs horizontal-deflection-pulse 340B having a phase in advance of that of pulse 340A.

Next, assume that the phase of the horizontal-deflection-pulse 340B advances from a desirable phase. At this time, this advancement entails the averaged dc voltage 365 to increase from "Vav1" to "Vav2". The higher averaged voltage "Vav2" further delays the phase of horizontal-drive-pulse 380B. As a result, at the next timing, horizontal-deflection-circuit 130 outputs a horizontal-deflection-pulse having a phase delayed from that of horizontal-deflection-pulse 340B.

The feedback control as discussed above realizes production of the horizontal-drive-pulse which controls the phase of the horizontal deflection pulse corresponding to a format of video-input-signal.

Next, the production of the horizontal-drive-pulse is detailed hereinafter.

Figure 3A:
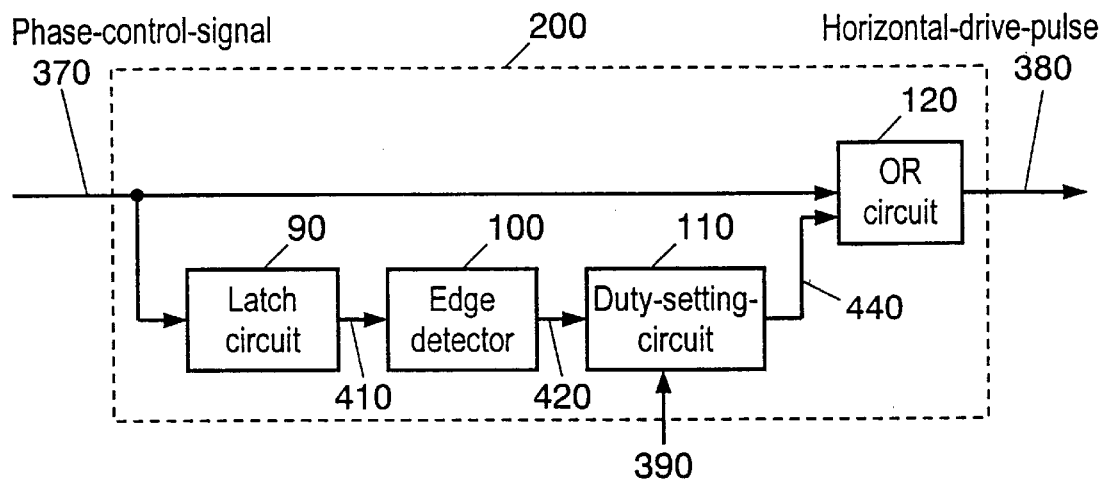
FIG. 3A is a block diagram illuistrating horizontal-drive-pulse-generating circuit 20.
Figure 3B:
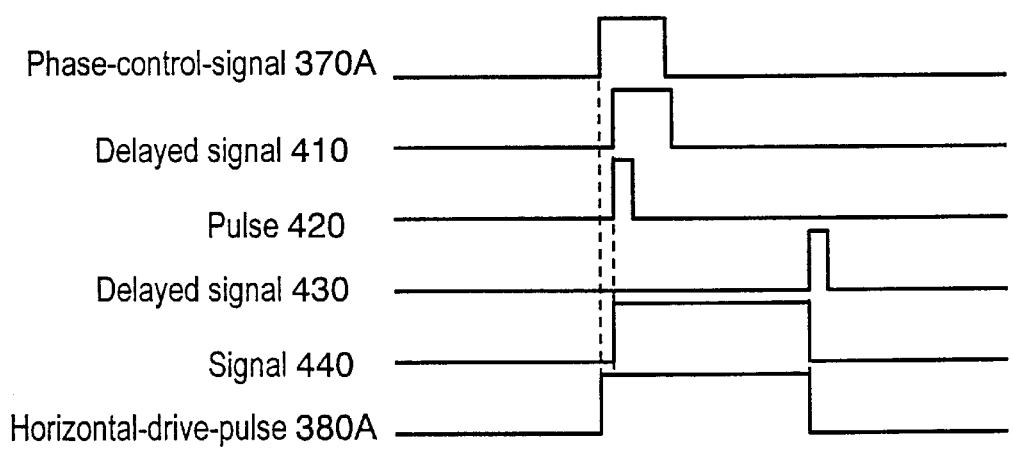
FIG. 3B shows waveforms of respective sections shown in FIG. 3A.

In FIG. 3A and FIG. 3B, latch circuit 90 receives phase-control-signal 370, then supplies signal 410 delaying by a first given time. Edge detector 100 detects a rising edge of signal 410, then supplies pulse 420 synchronizing with the edge and having a given width. Duty-setting-circuit 110 produces pulse 430 delaying from pulse 420 by a second given time in response to discrimination signal 390 supplied from frequency discriminator 10. Circuit 110 then outputs signal 440 which rises when pulse 420 starts rising and falls when pulse 430 starts rising. The first and second given times have been stored in a memory in the form of a table and are selected form the table. OR circuit 120 calculates a logical inclusion (OR) of phase-control-signal 370 and signal 440, then outputs the result as horizontal-drive-pulse 380. A rise of this horizontal drive pulse 380 determines a phase of horizontal-deflection-pulse 340. Horizontal-deflection-circuit 130 stores electromagnetic energy in a deflection coil corresponding to the format of the video-input-signal. Volume of the stored energy depends on a pulse width of pulse 380.

The phase controller of the horizontal-drive-pulse of the present invention, as discussed above, changes the phase of horizontal deflection pulse to the phase of horizontal sync signal depending on a format of a video-input-signal relatively when the video signal different from a normal television signal is input. This video-input-signal may differ from the television signal in a frequency of the horizontal sync signal. This phase change is performed following the data stored in a memory in the form of a table. As a result, the phase controller of the present invention displays a video signal at a given horizontal position regardless of format types.

Exemplary Embodiment 2

Figure 4:
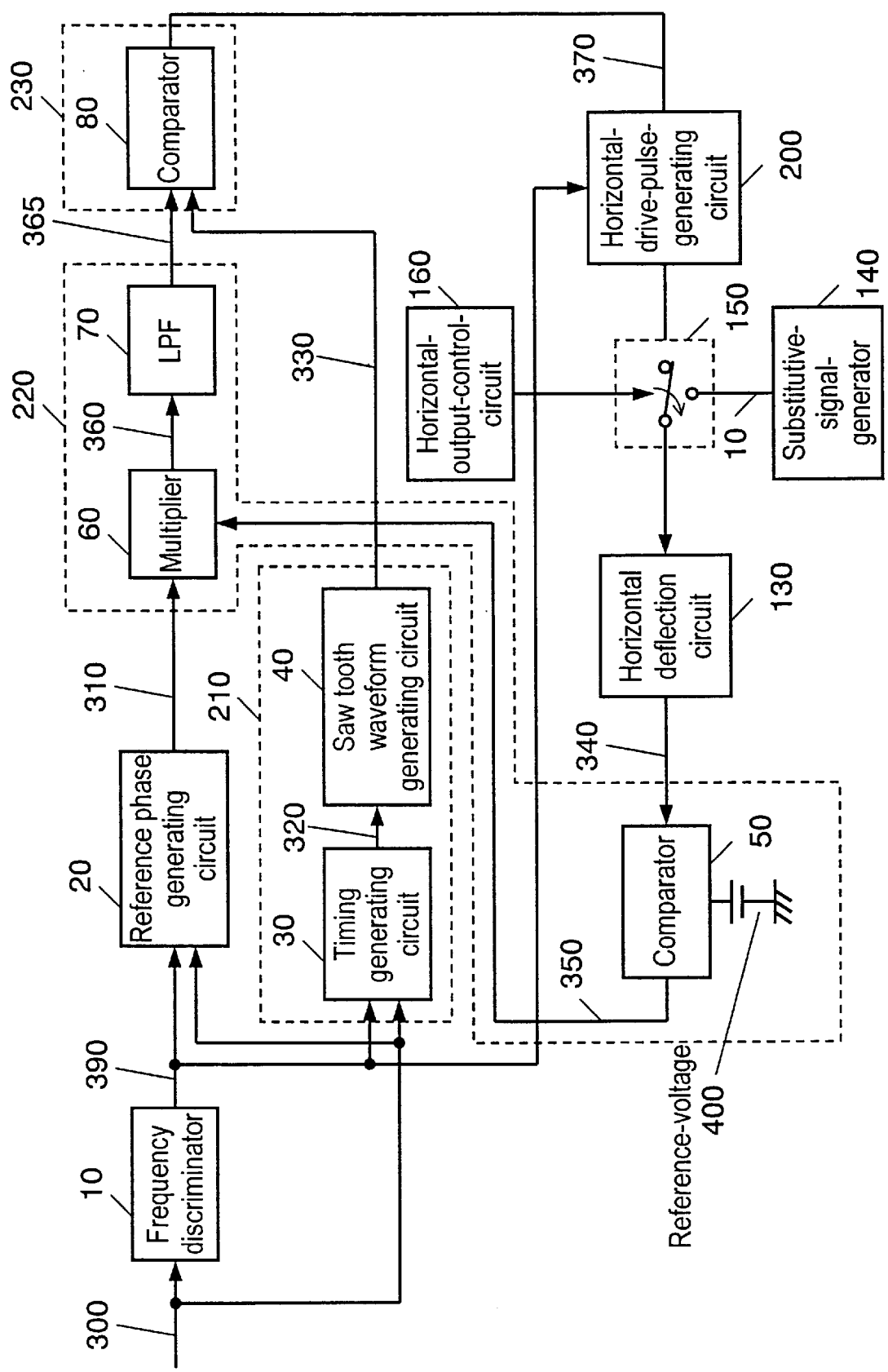
FIG. 4 is a block diagram illustrating a phase controller of the horizontal drive pulse in accordance with a second exemplary embodiment of the present invention.

A phase controller of a horizontal-drive-pulse in accordance with the second exemplary embodiment of the present invention is demonstrated hereinafter with reference to FIG. 4. In FIG. 4, the elements operating in the same manner as in FIG. 1 bear the same marks, and the descriptions thereof are thus omitted here.

In the first exemplary embodiment, the phase of horizontal-drive-pulse is sometimes not controlled satisfactorily when a horizontal sync signal is unstable, e.g. when a frequency is switched or the power is turned on. The second embodiment overcomes this problem, thereby providing the better phase controller.

Substitutive signal generator 140 generates and outputs a substitutive signal—independent of an output signal from horizontal-drive-pulse-generating circuit 200—based on a free-run clock signal produced by generator 140. When detecting a frequency-switch or a power-on, both involved in switching an video-input-signal, horizontal-output-control-circuit 160 outputs a signal indicating the detection of the frequency-switch or power-on. Based on this output from circuit 160, switcher 150 outputs substitutive signal 410 for the output signal supplied from horizontal-drive-pulse-generating circuit 200—signal 410 is supplied from substitutive-signal-generator 140—into horizontal-deflection-circuit 130 when the horizontal sync signal becomes unstable due to the frequency-switch or power-on.

When the horizontal-drive-pulse is not completely controlled due to the power-on or the switch of a video-input-signal, the structure discussed above prevents horizontal-deflection-circuit 130 from being fed the horizontal-drive-pulse missing some pulses, and thus allows circuit 130 to operate in a stable manner.

Industrial Applicability

A phase controller and a method of controlling the horizontal-drive-pulses of the present invention identify which format of timing the vide-signal fed into a video display device including a TV has, based on a frequency of the horizontal sync signal. Then the controller and the method control the horizontal deflection pulse to carry the pulses proper to the timing format of the video signal.

Further, the controller and the controlling method of the present invention prevent the horizontal deflection circuit from being fed unstable horizontal drive pulses, and thus allow this circuit to operate in a stable manner.

What is claimed is:

1. A phase controller of a horizontal drive pulse fed into a horizontal deflection circuit supplying a horizontal deflection pulse, said controller comprising:
    (a) a frequency discriminator for identifying a format of a video-input-signal by detecting a frequency of a horizontal sync signal;
    (b) a reference phase signal generator for generating a reference phase signal based on an output signal from said frequency discriminator and a given data;
    (c) a sawtooth waveform generator for generating a sawtooth waveform signal having a width responsive to the output from said frequency discriminator;
    (d) a phase difference voltage detector for outputting a phase difference voltage responsive to a phase difference between the reference phase signal and the horizontal deflection pulse;
    (e) a phase control signal generator for generating a phase control signal based on the phase difference voltage and the sawtooth waveform signal; and
    (f) a horizontal drive pulse generator for outputting the horizontal drive pulse having a phase responsive to the phase control signal.

2. The phase controller as defined in claim 1 further comprising:
    a substitutive signal generator for outputting a substitutive signal independent of the horizontal drive pulse; and
    a switcher for outputting one of the horizontal drive pulse and the substitutive signal by switching between these two to the horizontal deflection circuit, wherein said switcher outputs the substitutive signal during a period other than a period when the horizontal sync signal is stable.

3. The phase controller as defined in claim 1 wherein said phase difference voltage detector includes:
    a comparator for comparing the horizontal deflection pulse with a given voltage and outputting a resultant signal;
    a multiplier for multiplying the reference phase signal and the resultant signal supplied from said comparator;
    a low pass filter for averaging an output signal from said multiplier and outputting an averaged result as the phase difference voltage.

4. The phase controller as defined in claim 1 wherein said horizontal drive pulse generator determines a duty rate of the horizontal drive pulse based on a result identified by said frequency discriminator.

5. The phase controller as defined in claim 1 wherein said phase control signal generator includes a comparator for comparing the sawtooth waveform signal with the phase difference voltage.

6. A method of controlling a horizontal drive pulse fed into a horizontal deflection circuit supplying a horizontal deflection pulse, said method comprising the steps of:
    (a) identifying a format of a video-input-signal by detecting a frequency of a horizontal sync signal, and generating a signal indicating the format of the video-input-signal;
    (b) generating a reference phase signal based on the signal generated in said step (a) and a given data;
    (c) generating a sawtooth waveform signal responsive to the signal generated in said step (a);
    (d) outputting a phase difference voltage responsive to a phase difference between the reference phase signal and the horizontal deflection pulse;
    (e) generating a phase control signal based on the phase difference voltage and the sawtooth waveform signal; and
    (f) generating a horizontal drive pulse having a phase responsive to the phase control signal.

7. The method as defined in claim 6 further comprising the steps of:
    generating a substitutive signal independent of the horizontal drive pulse; and
    outputting the substitutive signal for the horizontal drive pulse into the horizontal deflection circuit during a period other than a period when the horizontal sync signal is stable.

8. The method as defined in claim 6 wherein said step (d) includes the steps of:
    (d-1) comparing the horizontal deflection pulse with a given voltage and then generating a resultant signal;
    (d-2) generating a signal by multiplying the reference phase signal and the resultant signal generated in said step (d-1); and (d-3) averaging the signal generated in said step (d-2) and outputting a resultant averaged signal as the phase difference voltage.

9. The method as defined in claim 6 wherein said step (f) includes a step of determining a duty cycle of the horizontal drive pulse based on the signal generated in said step (a).

10. The method as defined in claim 6 wherein said step (e) includes a step of comparing the sawtooth waveform signal with the phase difference voltage and generating a resultant signal indicating a comparison result.

* * * * *